J. R. PARKS.
APPARATUS FOR OBTAINING PRECIOUS METALS.
APPLICATION FILED JUNE 24, 1907.
984,842.
Patented Feb. 21, 1911.
2 SHEETS—SHEET 1.
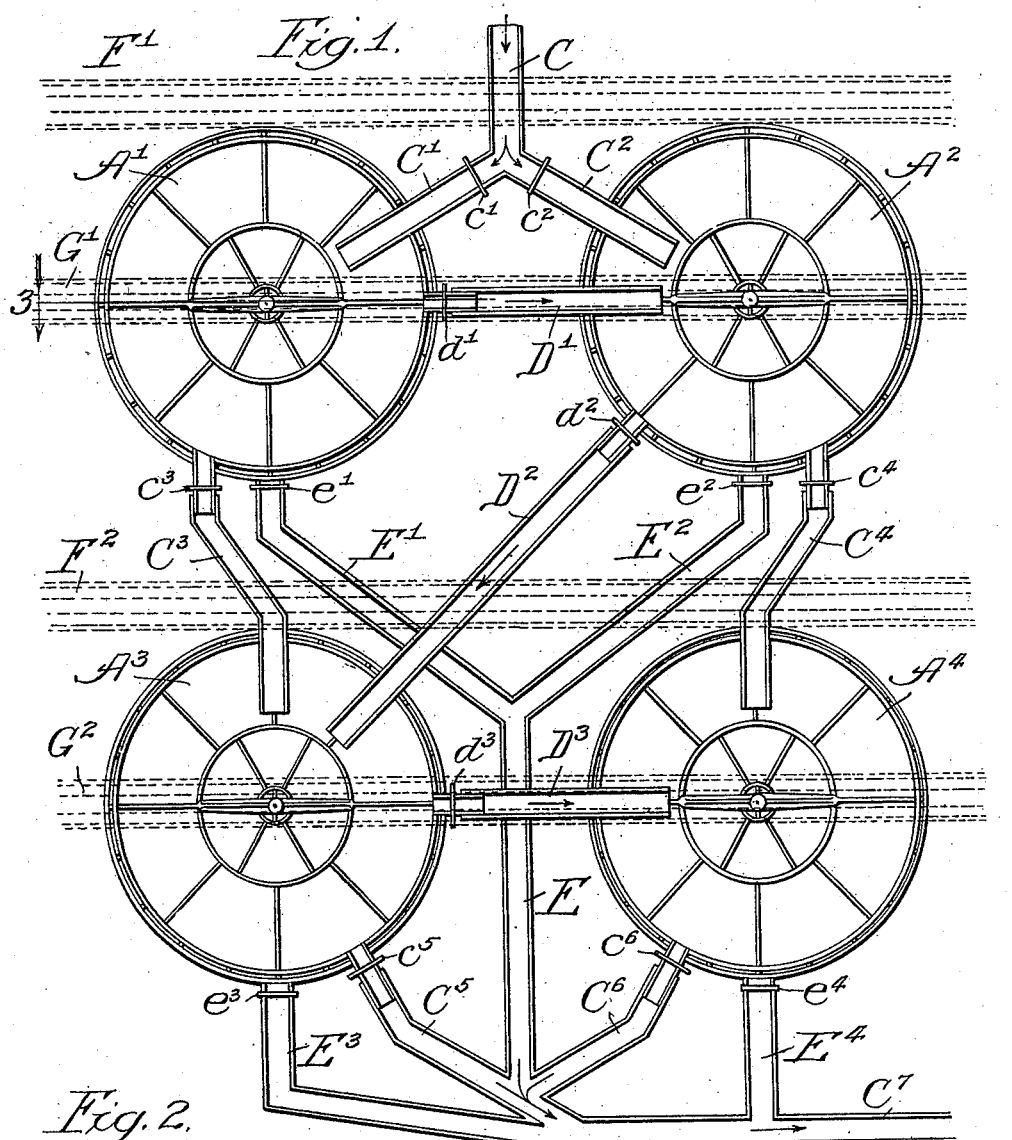
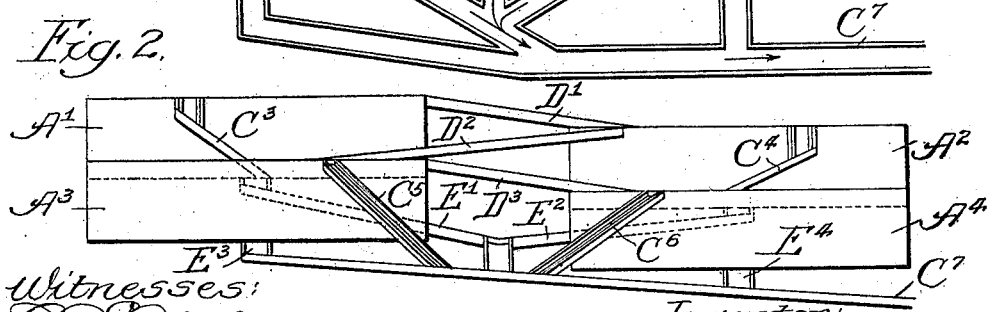

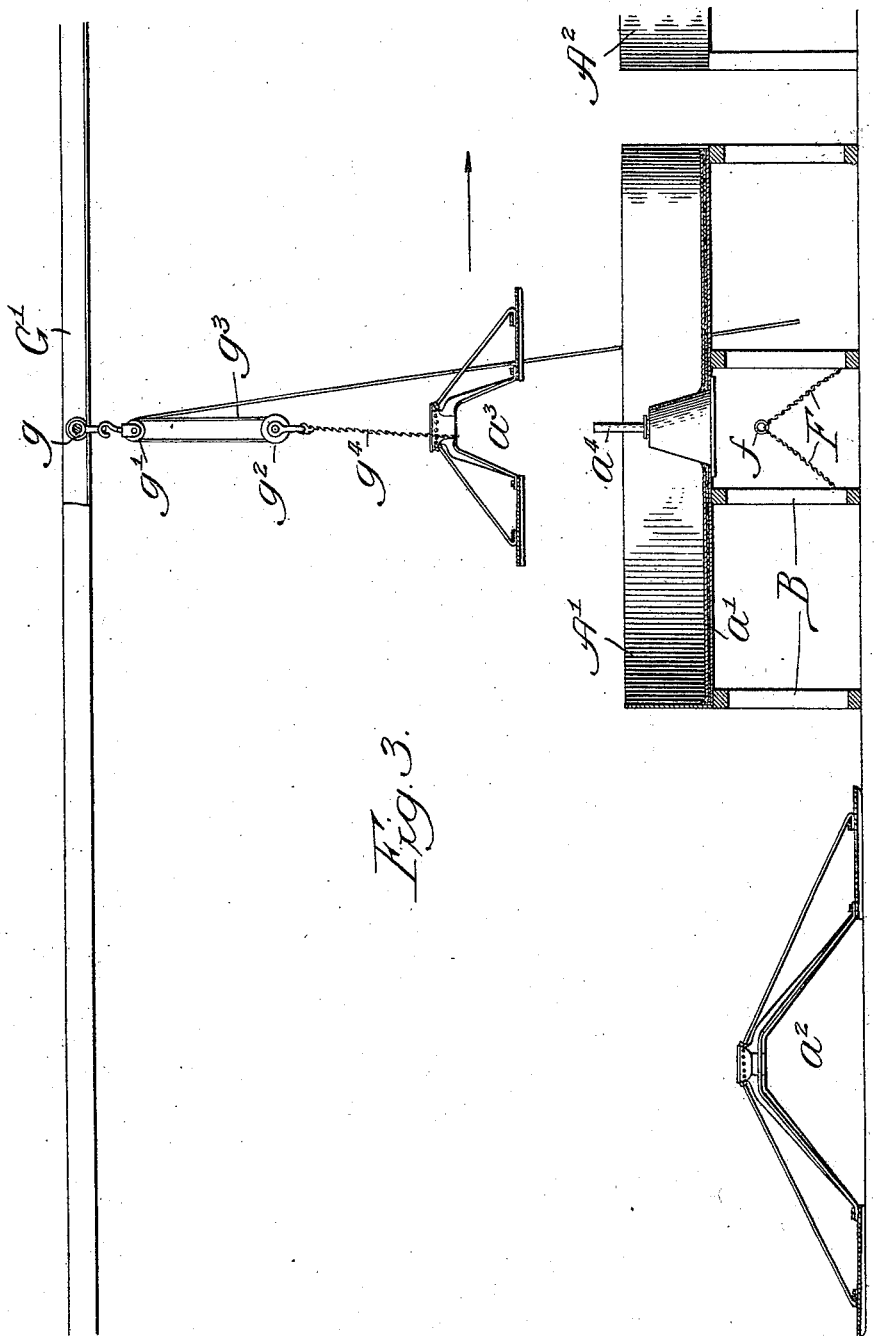

UNITED STATES PATENT OFFICE.

JOHN R. PARKS, OF SPOKANE, WASHINGTON.

APPARATUS FOR OBTAINING PRECIOUS METALS.

984,842.  Specification of Letters Patent.  Patented Feb. 21, 1911.

Application filed June 24, 1907. Serial No. 380,489.

*To all whom it may concern:*

Be it known that I, JOHN R. PARKS, a citizen of the United States, residing at Spokane, in the county of Spokane and State of Washington, have invented certain new and useful Improvements in Apparatus for Obtaining Precious Metals, of which the following is a specification.

My invention relates in general to the extraction of precious metals from ores, and more particularly to obtaining precious metal values by electro-chemical reduction.

In my co-pending application Serial No. 344,777, filed November 23, 1906, I have described and claimed an improved process for obtaining precious metal values, consisting of passing a liquid containing precious metals through a series of extraction pans arranged in tandem and excluding each pan individually from the series while the liquid continues to pass through the other pans, thereby permitting the removal of the deposited metals from the pans separately without interfering with the deposit of the metals in the other pans.

The primary object of my invention is to provide an apparatus for economically and efficiently practicing the improved process covered by my said co-pending application.

A further object of my invention is to provide an improved apparatus for extracting precious metals, which will be simple in construction, economical in operation, and practical in use.

My invention will be more fully described hereinafter with reference to the accompanying drawings, in which—

Figure 1 is a diagrammatic view indicating a plan of the apparatus; Fig. 2 a diagrammatic elevational view of the apparatus looking upwardly with respect to Fig. 1; and Fig. 3 a sectional view, taken on line 3 of Fig. 1, showing the means for removing the anodes of a pan preparatory to "cleaning up" the same.

The same reference characters are used to designate the same parts in the several figures of the drawings.

Reference characters $A^1$, $A^2$, $A^3$ and $A^4$ designate extraction pans, through which a liquid containing precious metals flows and within which the precious metals are deposited.

My present invention is not limited to the specific form of the extraction pan employed, and it is therefore unnecessary to illustrate or describe the same in detail. Extraction pans such as illustrated and described in my prior Patent No. 796,753, issued to me August 8, 1905, for a machine for treating ores, may be conveniently used as parts of my present apparatus.

C designates a launder, through which liquid containing precious metals is supplied to the extraction pans. So far as my present invention is concerned, the precious metals may be supplied to the extraction pans in the form of a solution of precious metal salts, or as suspended particles of native precious metals, or as suspended particles of precious metal minerals. Ordinarily a pulp is supplied through the launder C to the extraction pans, such pulp consisting of pulverized ore, prepared chemical solution, and water.

Branch launders $C^1$ and $C^2$ lead from the main supply launder C to the pans $A^1$ and $A^2$, each of such branch launders being provided with valves $c'$ and $c^2$. Launders $C^3$ and $C^4$ lead from the pans $A^1$ and $A^2$ to the pans $A^3$ and $A^4$, respectively, such launders being provided with valves $c^3$ and $c^4$. Launders $c^5$ and $c^6$ having therein valves $c^5$ and $c^6$ lead from the pans $A^3$ and $A^4$ to a common discharge launder $C^7$, which may lead to a settler or amalgam trap (not shown). A launder $D^1$ leads from the pan $A^1$ to the pan $A^2$ and is provided with a valve $d^1$; while $D^2$ designates a launder leading from the pan $A^2$ to the pan $A^3$, such launder being provided with a valve $d^2$.

$D^3$ indicates a launder directly connecting the pan $A^3$ with the pan $A^4$ and provided with a valve $d^3$.

The pans are supported at different elevations by any suitable supporting frame, such as that indicated in Fig. 3 by reference character B, such supporting frame being so arranged as to permit the pans to be tilted. The pan $A^1$ is located at a higher level than is the pan $A^2$, while the pan $A^2$ is at a higher level than the pan $A^3$, the latter pan being higher than the last pan $A^4$. By supporting the pans at different elevations, the liquid containing the precious metals will flow successively through the pans by gravity.

When the apparatus is first supplied with liquid containing precious metals, such liquid passes through the launder C and the branch launder $C^1$ to the pan $A^1$, thence through the cross launder $D^1$ to the pan $A^2$, thence through the cross launder $D^2$ to the pan $A^3$, and thence through the cross launder $D^3$ to the pan $A^4$, from which the liquid flows through the branch launder $C^6$ to the discharge launder $C^7$.

In order to direct the liquid in the course above described, the valves in the branch launders $C^2$, $C^3$, $C^4$ and $C^5$, are closed. After the liquid has flowed through the pans a sufficient length of time for the precious metal to be deposited in sufficient quantities to warrant the pans being "cleaned up," each pan individually is cut out of the series, while the remaining pans continue in the series so that the liquid may continuously pass through all of the pans, except the one which is excluded for the removal of the deposited metal therefrom.

In order to disconnect the pan $A^1$ from the series and continue the flow of fluid through the remaining pans, the gates in the branch launders $C^1$, $D^1$, $C^3$, $C^4$ and $C^5$, are closed; while the valves in the other launders are opened, thereby directing the flow of the liquid through the branch launder $C^2$ to the pan $A^2$, thence through the launder $D^2$ to the pan $A^3$, thence through the launder $D^3$ to the pan $A^4$, thence through the launder $C^6$ to the discharge launder $C^7$. After the pan $A^1$ has been "cleaned up," it is connected in series with two of the other pans, and the fourth pan is disconnected from the series, in order that it may have the deposit of metal removed therefrom. The pan $A^2$ may be excluded from the series by closing the valves in the launders $C^2$, $D^1$, $C^4$ $D^2$ and $C^5$, so that the liquid will flow through the launder $C^1$ to the pan $A^1$, thence through the launder $C^3$ to the pan $A^3$, thence through launder $D^3$ to pan $A^4$, and thence through launder $C^6$ to the discharge launder $C^7$.

The pan $A^3$ may be excluded from the series, and the flow continued through the other pans by closing the valves $c^2$, $c^3$, $d^2$ and $c^5$, so that liquid will flow through $C^1$ to pan $A^1$, thence through launder $D^1$ to pan $A^2$, thence through launder $C^4$ to pan $A^4$, and thence through launder $C^6$ to the discharge launder $C^7$. The pan $A^4$ may be excluded from the series, and the liquid caused to flow through the remaining pans by closing the valves $c^2$, $c^3$, $c^4$, $d^3$ and $c^6$, so that the liquid will flow through the launder $C^1$ to pan $A^1$, thence through launder $D^1$ to pan $A^2$, thence through launder $D^2$ to pan $A^3$, thence through launder $C^5$ to the discharge launder $C^7$.

It will be observed that in the above arrangement of pans, launders and valves, whenever a single pan is excluded the remaining pans will be connected, so that each succeeding pan will be at a lower level than the immediate preceding one, thereby insuring the flow of the liquid through the connected pans by gravity.

Leading from the bottoms of the several pans are discharge launders, through which the liquids may be discharged individually from the pans prior to the deposited metals being removed therefrom.

$E^1$ and $E^2$ indicate the discharge launders leading from the bottoms of the pans $A^1$ and $A^2$ and provided with valves $e'$ and $e^2$, respectively. The discharge launders $E^1$ and $E^2$ connect with a common launder $E$, with which also are connected branch discharge launders $E^3$ and $E^4$ leading from the bottoms of the pans $A^3$ and $A^4$, such branch launders being provided with valves $e^3$ and $e^4$. The common discharge launder $E$ may conveniently lead to the same launder, viz., $C^7$, with which the branch launders $C^5$ and $C^6$ communicate. All of the valves in the discharge launders $E^1$, $E^2$, $E^3$ and $E^4$ are normally closed, the valve in the discharge launder leading from the pan which has been cut out of the series is, however, opened, so as to permit the liquid therein to flow through the discharge launders.

In order to facilitate the flow of the liquid from the pan from which the deposited metals are to be removed, I provide trolley tracks $F^1$, $F^2$, extending above the pairs of pins $A^1$, $A^2$ and $A^3$ $A^4$, such tracks being above the edges of the pairs of pans opposite the points from which the discharge launders lead. A trolley, such as indicated at $g$ in Fig. 3, engages each of the tracks $F^1$ and $F^2$ and has depending therefrom suitable hoisting mechanism, such, for instance, as pulleys $g^1$ and $g^2$, around which passes a rope $g^3$. The lower pulley $g^2$ is provided with a sheave, from which depends a chain $g^4$, or other suitable means for securing the sheave to an object to be elevated.

The supporting framework of each of the pans is provided with suitable means, such, for instance, as chains $F$, and a ring $f$ united to the chains with which the chains $g^4$ of the hoisting mechanism may be connected. The chains $F$ are located on the supporting framework of each pan, diametrically opposite to the point from which the discharge launder leads. Trolley tracks $G^1$ and $G^2$ are also provided above the centers of the pairs of pans $A^1$ $A^2$ and $A^3$ $A^4$, each of such tracks supporting a trolley and hoisting mechanism such as illustrated in Fig. 3. The tracks $G^1$ and $G^2$, and the hoisting mechanism traveling thereon, are utilized for lifting the anodes from the pans, preparatory to the removal of the deposited metal therefrom. By reference to Fig. 3 it will be seen that the larger section $a^2$ of the anode of the pan $A^1$ has been removed from the supporting post $a^4$ by the hoisting mechanism, while the smaller section $a^3$ of the anode is in the act of being removed by the hoisting mechanism.

The operation of removing the deposited metal from each pan, after it has been excluded from the series through which the fluid containing the precious metals flows, comprises, first, lifting the sections of anode out of the pan by means of the hoisting mechanism supported by the trolley on the track above the pan, after which the hoisting mechanism carried by and traveling upon the track $F^1$ or $F^2$ connected with the ring $f$ of the chain F, connected to the supporting frame of the pan, so that the pan may be tilted, thereby facilitating the flow of the fluid through the discharge launder. After the fluid has been discharged the solid matter remaining within the pan is dislodged by a stream of water, so that it will be carried through the discharge launder. The pan is then allowed to return to its horizontal position, after which the deposited metals are scraped from the cathode $a^1$ and removed from the pan. The sections of the anodes are then returned to their proper positions within the pan, and it is ready to be connected in series with other pans, for the liquid to again flow through the same and deposit another charge of metal thereon.

From the foregoing description it will be observed that I have invented an improved apparatus, by means of which any one of a plurality of extracting pans may be cleaned up while a fluid containing precious metals flows through the other pans in series, thereby permitting the apparatus to be in continual use without interruption. It will also be observed that I have invented improved means for facilitating the removal of the deposited precious metals from an extraction pan.

I claim:

1. In an apparatus for obtaining precious metals from liquids containing the same, the combination with a plurality of extraction pans, of means for supporting the pans at different levels, launders connecting the pans in series according to their respective elevations so that the liquid will flow by gravity through the pans in succession, means for discontinuing the flow of the fluid through any one of such pans, and means for connecting the remaining pans in series according to their relative elevations.

2. In an apparatus for obtaining precious metals from liquids containing the same, the combination with an electrolytic extraction pan comprising a fixed cathode and a removable anode, of tracks supported above said pan, hoisting mechanism traveling upon said tracks, and means for detachably connecting said hoisting mechanism with the anode of said pan, whereby said anode may be removed preparatory to removing the deposited metal from the pan.

3. In an apparatus for obtaining precious metals from liquids containing the same, the combination with a plurality of extraction pans, of launders connecting the pans in series so that the liquid will pass through the pans in succession, means for discontinuing the flow of the liquid through any one of said pans, means for conducting the liquid through the remaining pans in succession, a discharge launder leading from the bottom of each of said pans, and means for tilting each pan after it has been disconnected from the series of pans, thereby facilitating the flow of the lquid through the discharge launder.

4. In an apparatus for obtaining precious metals from liquids containing the same, the combination with a plurality of electrolytic extraction pans each comprising a fixed cathode and removable anode of launders for delivering the liquid containing the precious metals to such pans, discharge launders leading from such pans, means for discontinuing the supply of liquid to each of such pans, means for removing the anode from the disconnected pan, and means for titling each of said pans to facilitate the flow of liquid therefrom to the discharge launder.

5. In an apparatus for obtaining precious metals from liquids containing the same, the combination with an electrolytic extraction pan comprising a fixed cathode and a removable anode, of a track supported above said pan, hoisting mechanism traveling upon said track, means for detachably connecting said hoisting mechanism with the anode of said pan to remove the same preparatory to removing the deposited metal from the pan, and means for detachably connecting said hoisting mechanism with said pan to tilt the same to facilitate the flow of liquid therefrom.

JOHN R. PARKS.

Witnesses:
 GEO. L. WILKINSON,
 ANNIE C. COURTENAY.